(12) United States Patent
Ackermann et al.

(10) Patent No.: US 11,945,983 B2
(45) Date of Patent: Apr. 2, 2024

(54) SELF-ADHERING SEALING DEVICE WITH AN ADHESIVE SEALANT LAYER

(71) Applicant: SIKA TECHNOLOGY AG, Baar (CH)

(72) Inventors: Herbert Ackermann, Tann (CH); Simon Schönbrodt, Sarnen (CH); Carine Kerber, Sarnen (CH); Robert Roskamp, Altdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 635 days.

(21) Appl. No.: 15/734,426

(22) PCT Filed: Jul. 12, 2019

(86) PCT No.: PCT/EP2019/068919
§ 371 (c)(1),
(2) Date: Dec. 2, 2020

(87) PCT Pub. No.: WO2020/012031
PCT Pub. Date: Jan. 16, 2020

(65) Prior Publication Data
US 2021/0171808 A1    Jun. 10, 2021

(30) Foreign Application Priority Data

Jul. 12, 2018    (EP) .................................... 18183173

(51) Int. Cl.
*C09J 7/38*    (2018.01)
*B32B 5/02*    (2006.01)
(Continued)

(52) U.S. Cl.
CPC .............. *C09J 7/383* (2018.01); *B32B 5/022* (2013.01); *B32B 27/12* (2013.01); *B32B 27/32* (2013.01);
(Continued)

(58) Field of Classification Search
CPC .. C09J 7/383; C09J 2301/408; C09J 2400/16; C09J 2409/00; C09J 2423/16; C09J 7/29;
(Continued)

(56) References Cited

U.S. PATENT DOCUMENTS 4,366,284 A * 12/1982 Ishido ....................... E04B 1/68
524/565
4,656,062 A    4/1987 Harriett
(Continued)

FOREIGN PATENT DOCUMENTS

CN    107779142 A    3/2018
DE    60027479 T2 * 11/2006 ............. B32B 27/08
(Continued)

OTHER PUBLICATIONS

Dec. 9, 2019 Search Report issued in the International Patent Application No. PCT/EP2019/068919.
(Continued)

*Primary Examiner* — Brian D Mattei
*Assistant Examiner* — Omar F Hijaz
(74) *Attorney, Agent, or Firm* — Oliff PLC (57) ABSTRACT

A sealing device includes a waterproofing membrane, an adhesive sealant layer, and optionally a release liner, wherein the adhesive sealant layer includes at least one elastomer, at least one at 25° C. liquid polyolefin resin, and at least one inert mineral filler. An adhesive sealant composition is used to form the adhesive sealant layer. The sealant device may be used to waterproof a substrate and provide a fully-adhered roof system. The adhesive sealant composition may be used to provide a self-healing roofing membrane.

20 Claims, 2 Drawing Sheets

(51) Int. Cl.
*B32B 27/12* (2006.01)
*B32B 27/32* (2006.01)
*E04B 1/66* (2006.01)
*E04D 5/10* (2006.01)
*E04D 5/14* (2006.01)
*E04D 11/02* (2006.01)

(52) U.S. Cl.
CPC ............... *E04B 1/665* (2013.01); *E04D 5/10* (2013.01); *E04D 5/148* (2013.01); *E04D 11/02* (2013.01); *B32B 2307/202* (2013.01); *B32B 2307/7265* (2013.01); *B32B 2419/06* (2013.01); *C09J 2301/408* (2020.08); *C09J 2400/16* (2013.01); *C09J 2409/00* (2013.01); *C09J 2423/16* (2013.01)

(58) Field of Classification Search
CPC ... C09J 7/30; C09J 11/00; B32B 5/022; B32B 27/12; B32B 27/32; B32B 2307/202; B32B 2307/7265; B32B 2419/06; B32B 25/08; B32B 2581/00; B32B 27/20; B32B 27/22; B32B 27/30; B32B 27/304; B32B 27/306; B32B 27/34; B32B 27/36; B32B 27/08; B32B 7/06; B32B 7/12; B32B 5/02; E04B 1/665; E04D 5/10; E04D 5/148; E04D 11/02
See application file for complete search history.

(56) References Cited

U.S. PATENT DOCUMENTS

| | | | | |
|---|---|---|---|---|
| 4,787,780 | A | * | 11/1988 | Harriett ............... C09D 5/34 405/270 |
| 5,415,906 | A | * | 5/1995 | Miyakawa ........... B32B 27/306 428/408 |
| 9,528,289 | B2 | | 12/2016 | Gilbreath et al. |
| 9,995,014 | B2 | * | 6/2018 | Donovan ............. E02D 17/202 |
| 2005/0043468 | A1 | | 2/2005 | Fisher |
| 2015/0354218 | A1 | * | 12/2015 | Houchin ............... B32B 25/06 428/192 |

FOREIGN PATENT DOCUMENTS

| | | | | |
|---|---|---|---|---|
| EP | 0 164 197 A2 | | 12/1985 | |
| EP | 0 729 986 A2 | | 9/1996 | |
| EP | 3064561 A1 | * | 9/2016 | ........... B32B 13/045 |
| EP | 3 287 276 A1 | | 2/2018 | |
| JP | 2010-241152 A | | 10/2010 | |
| JP | 2016-169590 A | | 9/2016 | |
| WO | WO-2010043661 A1 | * | 4/2010 | ............... B32B 3/10 |
| WO | WO-2011023768 A1 | * | 3/2011 | ............ C09J 123/12 |
| WO | 2015/127562 A1 | | 9/2015 | |
| WO | 2016/027799 A1 | | 2/2016 | |
| WO | 2019/025584 A1 | | 2/2019 | |

OTHER PUBLICATIONS

Dec. 9, 2019 Written Opinion of the International Searching Authority ssued in the International Patent Application No. PCT/EP2019/068919.

* cited by examiner

SELF-ADHERING SEALING DEVICE WITH AN ADHESIVE SEALANT LAYER

TECHNICAL FIELD

The invention relates to the field of waterproofing of underground and above ground building constructions by using self-adhering sealing devices. In particular, the invention relates to self-adhering roofing membranes, which can be used for providing fully adhered roof systems.

BACKGROUND OF THE INVENTION

In the field of construction polymeric sheets, which are often referred to as membranes or panels, are used to protect underground and above ground constructions, such as basements, tunnels, and flat and low-sloped roofs, against penetration water. Waterproofing membranes are applied, for example, to prevent ingress of water through cracks that develop in the concrete structure due to building settlement, load deflection or concrete shrinkage. Roofing membranes used for waterproofing of flat and low-sloped roof structures are typically provided as single-ply or multi-ply membrane systems. In a single-ply system, the roof substrate is covered using a roofing membrane composed of single barrier layer, which is can be mechanically stabilized with a reinforcement layer, typically a layer of fiber material. In multi-ply systems, a roofing membrane composed of multiple layers of different or similar materials is used. Single-ply roofing membranes have the advantage of lower production costs compared to the multi-ply membranes but they are also less resistant to mechanical damages caused by punctures of sharp objects.

Commonly used materials for waterproofing and roofing membranes include plastics, in particular thermoplastics such as plasticized polyvinylchloride (p-PVC), thermoplastic olefins (TPE-O, TPO), and elastomers such as ethylene-propylene diene monomer (EPDM). The membranes are typically delivered to a construction site in form of rolls, transferred to the place of installation, unrolled, and adhered to the substrate to be waterproofed. The substrate on which the membrane is adhered may be comprised of variety of materials depending on the installation site. The substrate may, for example, be a concrete, metal, or wood deck, or it may include an insulation board or recover board and/or an existing membrane.

Roofing membranes must be securely fastened to the roof substrate to provide sufficient mechanical strength to resist the shearing forces applied on it due to high wind loads. Roof systems are typically divided into two categories depending on the means used for fastening the roofing membrane to roof substrate. In a mechanically attached roof system, the roofing membrane is fastened to the roof substrate by using screws and/or barbed plates. Mechanical fastening enables high strength bonding but it provides direct attachment to the roof substrate only at locations where a mechanical fastener affixes the membrane to the surface, which makes mechanically attached membranes susceptible to flutter. In fully-adhered roof systems the membrane is typically adhered to the roof substrate indirectly by using an adhesive composition.

Roofing membranes can be adhesively adhered to roof substrates by using a number of techniques including contact bonding and using self-adhering membranes. In contact bonding both the membrane and the surface of the roof substrate are first coated with a solvent or water based contact adhesive after which the membrane is contacted with the surface of the substrate. The volatile components of the contact adhesive are "flashed off" to provide a partially dried adhesive film prior to contacting the membrane with the substrate. A fully-adhered roof system can also be prepared by using self-adhering roofing membranes having a pre-applied layer of adhesive composition coated on one of the exterior surfaces of the membrane. Typically the pre-applied adhesive layer is covered with a release liner to prevent premature unwanted adhesion and to protect the adhesive layer from moisture, fouling, and other environmental factors. At the time of use the release liner is removed and the roofing membrane is secured to the substrate without using additional adhesives. Roofing membranes having a pre-applied adhesive layer covered by release liner are also known as "peel and stick membranes".

In order to create a continuous waterproofing seal on the surface of a roof substrate, the edges of adjacent roofing membranes are overlapped to form sealable joints. These joints can then be sealed by bonding the bottom surface of an overlapping edge to the top surface of another overlapping edge or by using sealing tapes bridging the gap between top surfaces of both overlapping edges. The choice of the technique used for bonding of the overlapping surfaces of the adjacent membranes depends on the type of the membranes. In case of membranes composed of thermoplastic or non-crosslinked elastomeric materials, the overlapping portions of adjacent membranes can be bonded to each other by heat-welding. In case of self-adhering membranes, an area near the lengthwise edges of the membrane is typically left free of the adhesive in order to enable joining of the overlapping edges by heat-welding. The overlapping portions of adjacent membranes can also be adhered to each other by using an adhesive.

The State-of-the-Art self-adhering single-ply roofing membranes typically comprise a separation layer between the barrier layer and the adhesive layer to ensure sufficient mechanical stability and long term compatibility of the adhesive and the barrier layer. The presence of the additional separation layer increases the production costs of the membrane. Furthermore, the seams between overlapping edges of adjacent membranes are typically sealed by heat-welding or by using special sealing tapes, both of which increase the installation time and eventually the costs of installation.

There thus remains a need for a self-adhering sealing device, which can be produced at lower costs compared to the State-of-the-Art self-adhering roofing membranes and which enables providing fully-adhered roof systems with decreased installation time and costs.

SUMMARY OF THE INVENTION

The object of the present invention is to provide a self-adhering sealing device, which can be used for sealing of underground and above ground constructions, in particular roof substrates, against penetration of water.

Another object of the present invention is to provide a self-adhering sealing device, which can be used for providing fully-adhered roof systems, in which the seams between overlapping edges of adjacent sealing devices can be adhesively bonded to each other.

The subject of the present invention is a sealing device as defined in claim 1.

It was surprisingly found out that a sealing device comprising a waterproofing membrane and an adhesive sealant layer having the composition as defined in claim 1 is able to solve or at least mitigate the problems of the State-of-the-Art self-adhering roofing membranes. In particular, it was surprisingly found out that such sealing devices can be provided without a separation layer positioned between the waterproofing membrane and the adhesive layer.

One of the advantages of the sealing device of the present invention is that it enables providing fully-adhered roofing systems with lower production and installation costs compared to the State-of-the-Art solutions.

Another advantage of the sealing device of the present invention is that enables providing fully-adhered roof systems, in which the seams between overlapping edges of adjacent sealing devices are adhesively bonded to each other using the same adhesive as that used for bonding of the sealing device to the surface of the roof substrate.

Still another advantage of the sealing device of the present invention is that it enables providing fully-adhered roof systems containing an electrically conductive layer immediately below and in intimate contact with waterproofing membrane. The presence of such electrically conductive layer between the waterproofing membrane and the surface of the roof substrate enables detection of breaches with both high and low voltage electrical methods.

Other aspects of the present invention are presented in other independent claims. Preferred aspects of the invention are presented in the dependent claims.

DETAILED DESCRIPTION OF THE INVENTION

The subject of the present invention is a sealing device (1), preferably a self-adhering sealing device comprising:
  i. A waterproofing membrane (2) having a first and a second primary exterior surface,
  ii. An adhesive sealant layer (3) covering at least portion of the second primary exterior surface of the waterproofing membrane (2), and
  iii. Optionally a release liner (4), wherein the adhesive sealant layer (3) is composed of a first composition comprising:
  a) At least one elastomer,
  b) At least one at 25° C. liquid polyolefin resin, and
  c) At least one inert mineral filler.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "elastomer" refers to any polymer or combination of polymers, which is capable of recovering from large deformations, and which can be, or already is, modified to a state in which it is essentially insoluble (but can swell) in a boiling solvent. Typical elastomers are capable of being elongated or deformed to at least 200% of their original dimension under an externally applied force, and will substantially resume the original dimensions, sustaining only small permanent set (typically no more than about 20%), after the external force is released. As used herein, the term "elastomer" may be used interchangeably with the term "rubber."

The term "molecular weight" refers to the molar mass (g/mol) of a molecule or a part of a molecule, also referred to as "moiety". The term "average molecular weight" refers to the number average molecular weight ($M_n$) of an oligomeric or polymeric mixture of molecules or moieties. The molecular weight may be determined by gel permeation chromatography.

The term "softening point" refers to a temperature at which compound softens in a rubber-like state, or a temperature at which the crystalline portion within the compound melts. The softening point can be determined by Ring and Ball measurement conducted according to DIN EN 1238 standard.

The term "melting temperature" refers to a crystalline melting point ($T_m$) as determined by differential scanning calorimetry (DSC) by using the method as defined in ISO 11357 standard using a heating rate of 2° C./min. The measurements can be performed with a Mettler Toledo DSC 3+ device and the $T_m$ values can be determined from the measured DSC-curve with the help of the DSC-software.

The term "glass transition temperature" ($T_g$) designates the temperature above which temperature a polymer component becomes soft and pliable, and below which it becomes hard and glassy. The glass transition temperature is preferably determined by differential scanning calorimetry method (DSC) according to ISO 11357 standard using a heating rate of 2° C./min. The measurements can be performed with a Mettler Toledo DSC 3+ device and the $T_g$ values can be determined from the measured DSC-curve with the help of the DSC-software.

The "amount or content of at least one component X" in a composition, for example "the amount of the at least one thermoplastic polymer" refers to the sum of the individual amounts of all thermoplastic polymers contained in the composition. Furthermore, in case the composition comprises 20 wt.-% of at least one thermoplastic polymer, the sum of the amounts of all thermoplastic polymers contained in the composition equals 20 wt.-%.

The term "room temperature" designates a temperature of 23° C.

The waterproofing membrane is preferably sheet-like element having first and second primary exterior surfaces. The term "sheet-like element" refers in the present document to elements having a length and width at least 25 times, preferably at least 50 times, more preferably at least 150 times greater than the thickness of the element. The term "primary exterior surface of the waterproofing membrane" refers to the outermost surfaces of the waterproofing membrane. For example, in case the waterproofing membrane comprises two barrier layers adhered to each other over their opposing major surfaces, the outer exterior surface of the second barrier layer facing away from the first barrier layer forms the second primary exterior surface of the waterproofing membrane whereas the outer exterior surface of the first waterproofing membrane facing away from the second waterproofing membrane forms the first primary exterior surface of the waterproofing membrane.

It may be preferable that the adhesive sealant layer covers at least 50%, more preferably at least 65%, most preferably at least 75% of the area of the second primary exterior surface of the waterproofing membrane. It may furthermore be preferable that the adhesive sealant layer and the waterproofing membrane have substantially same width and length and that the adhesive sealant layer covers substantially the entire area of the second primary exterior surface of the waterproofing membrane. The term "substantially entire area" is understood to mean at least 85%, preferably at least 90%, more preferably at least 95%, most preferably at least 97.5% of the area of the second primary exterior surface of the waterproofing membrane. Furthermore, it may be preferable, for example due to production technical reasons, that narrow segments on the second primary exterior surface of the waterproofing membrane near the longitudinal edges and having a width of 1-2 mm are not covered by the adhesive sealant layer.

Preferably, adhesive sealant layer is in a form of a continuous layer composed the first composition. The term "continuous layer" refers in the present document to layers consisting of one single area coated with the respective composition. In contrast, a "discontinuous layer" is considered to consist of more than one areas coated with the respective composition, which areas are not connected with each other to form a single continuous layer.

Preferably, the waterproofing membrane comprises a barrier layer having a first and a second major surface. The term "major surface" refers to the planar surfaces of a layer defining a thickness of said layer there between.

The barrier layer and the adhesive sealant layer can be directly or indirectly connected to each other over at least part of their opposing surfaces. The expression "directly connected" is understood to mean in the context of the present invention that no further layer or substance is present between the layers, and that the opposing surfaces of the layers are directly bonded to each other or adhere to each other. At the transition area between the two layers, the materials of the layers can also be present mixed with each other. The barrier layer and the adhesive sealant layer can be indirectly connected to each other, for example, via a connecting layer, such as a layer of adhesive or a layer of fiber material, or a combination thereof. In case a porous connecting layer, such as an open weave fabric, the adhesive sealant layer may be partially directly connected and partially indirectly connected to the barrier layer.

The composition of the barrier layer is not particularly restricted. However, the composition of the barrier layer should be selected such that the sealing device fulfills the general requirements for roofing membranes used for providing fully-adhered roof systems, in particular the general requirements as defined in DIN 20000-201:2015-08 standard.

It may, for example, be preferred that the composition of the barrier layer is selected such that the sealing device shows an impact resistance measured according to EN 12691: 2005 standard in the range of 200-1500 mm and/or a longitudinal and a transversal tensile strength measured at a temperature of 23° C. according to DIN ISO 527-3 standard of at least 5 MPa and/or a longitudinal and transversal elongation at break measured at a temperature of 23° C. according to DIN ISO 527-3 standard of at least 300% and/or a water resistance measured according to EN 1928 B standard of 0.6 bar for 24 hours and/or a maximum tear strength measured according to EN 12310-2 standard of at least 100 N.

According to one or more embodiments, the barrier layer is composed of a second composition comprising at least one thermoplastic polymer, preferably selected from the group consisting of ethylene-vinyl acetate copolymer (EVA), ethylene-acrylic ester copolymers, ethylene-α-olefin co-polymers, ethylene-propylene copolymers, propylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB). According to one or more embodiments, the at least one thermoplastic polymer is selected from the group consisting of low-density polyethylene, linear low-density polyethylene, high-density polyethylene, ethylene-vinyl acetate copolymer (EVA), ethylene-acrylic ester copolymers, ethylene-α-olefin copolymers, ethylene-propylene copolymers, propylene copolymers, and polypropylene (PP).

According to one or more embodiments, the at least one thermoplastic polymer comprises at least one thermoplastic polyolefin (TPO). The expression "the at least one thermoplastic polymer comprises at least one thermoplastic polyolefin" is understood to mean that the barrier layer comprises one or more thermoplastic polyolefins as representative(s) of the at least one thermoplastic polymer.

Thermoplastic polyolefins (TPO), which are also known as thermoplastic olefin elastomers (TPE-O), are heterophase polyolefin compositions containing a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Commercially available TPOs include reactor blends of the base polyolefin and the polyolefin modifier, also known as "in-situ TPOs" or "in-situ impact copolymers (ICP)", as well as physical blends of the aforementioned components. In case of a reactor-blend type of TPO, the components are typically produced in a sequential polymerization process, wherein the components of the matrix phase are produced in a first reactor and transferred to a second reactor, where the components of the dispersed phase are produced and incorporated as domains in the matrix phase. A physical-blend type of TPO is produced by melt-mixing the base polyolefin with the polyolefin modifier each of which was separately formed prior to blending of the components.

Reactor-blend type TPOs comprising polypropylene as the base polymer are often referred to as "heterophasic propylene copolymers" whereas reactor-blend type TPOs comprising polypropylene random copolymer as the base polymer are often referred to as "heterophasic propylene random copolymers". Depending on the amount of the polyolefin modifier, the commercially available heterophasic propylene copolymers are typically characterized as polypropylene "in-situ impact copolymers" (ICP) or as "reactor-TPOs" or as "soft-TPOs". The main difference between these types of TPOs is that the amount of the polyolefin modifier is typically lower in ICPs than in reactor-TPOs and soft-TPOs, such as not more than 40 wt.-%, in particular not more than 35 wt.-%. Consequently, typical ICPs tend to have a lower xylene cold soluble (XCS) content determined according to ISO 16152 2005 standard as well as higher flexural modulus determined according to ISO 178: 2010 standard compared to reactor-TPOs and soft-TPOs.

Suitable TPOs are commercially available, for example, under the trade name Hifax®, Adflex® and Adsyl® (all from Lyondell Basell), such as Hifax® CA 10A, Hifax® CA 12A, and Hifax® CA 212 A and under the trade name of Borsoft® (from Borealis Polymers), such as Borsoft® SD233 CF.

It may be preferable that the at least one thermoplastic polymer is present in the second composition in an amount of at least 15 wt.-%, more preferably at least 25 wt.-%, most preferably at least 35 wt.-%, based on the total weight of the second composition. According to one or more embodiments, the at least one thermoplastic polymer is present in the second composition in an amount of at least 50 wt.-%, preferably at least 60 wt.-%, more preferably at least 70 wt.-%, most preferably at least 85 wt.-%, based on the total weight of the second composition.

The barrier layer can comprise, in addition to the at least one thermoplastic polymer, auxiliary components, for example, UV- and heat stabilizers, antioxidants, plasticizers, flame retardants, fillers, dyes, pigments such as titanium dioxide and carbon black, matting agents, antistatic agents, impact modifiers, biocides, and processing aids such as lubricants, slip agents, antiblock agents, and denest aids. The total amount of these auxiliary components is preferably not more than 45 wt.-%, more preferably not more than 35 wt.-%, most preferably not more than 25 wt.-%, based on the total weight of the second composition.

It can be advantageous that the waterproofing membrane further comprises a top-coating coated on at least portion of the first major surface of the barrier layer facing from the adhesive sealant layer. The top-coating may comprise UV-absorbers and/or thermal stabilizers to protect the barrier layer from damaging influence of sunlight. The top-coating may also comprise color pigments in order to provide the barrier layer with a desired color.

The thickness of the barrier layer is not particularly restricted. It may be preferable that the barrier layer has a thickness determined by using the measurement method as defined in DIN EN 1849-2 standard of 0.2-5.0 mm, preferably 0.4-2.5 mm, even more preferably 0.5-2.0 mm, most preferably 0.5-1.5 mm.

According to one or more embodiments, the waterproofing membrane further comprises a layer of fiber material covering at least portion of the second major surface of the barrier layer, i.e. positioned between the barrier layer and the adhesive sealant layer. The layer of fiber material may be used to ensure the mechanical stability of the barrier layer when the sealing device is exposed to varying environmental conditions, in particular to large temperature fluctuations. In these embodiments, the outer exterior surface of the layer of fiber material facing away from the barrier layer preferably forms the second primary exterior surface of the waterproofing membrane.

The term "fiber material" designates in the present document materials composed of fibers comprising or consisting of, for example, organic, inorganic or synthetic organic materials. Examples of organic fibers include, for example, cellulose fibers, cotton fibers, and protein fibers. Particularly suitable synthetic organic materials include, for example, polyester, homopolymers and copolymers of ethylene and/or propylene, viscose, nylon, and polyamides. Fiber materials composed of inorganic fibers are also suitable, in particular, those composed of metal fibers or mineral fibers, such as glass fibers, aramid fibers, wollastonite fibers, and carbon fibers. Inorganic fibers, which have been surface treated, for example, with silanes, may also be suitable. The fiber material can comprise short fibers, long fibers, spun fibers (yarns), or filaments. The fibers can be aligned or drawn fibers. It may also be advantageous that the fiber material is composed of different types of fibers, both in terms of geometry and composition.

Preferably, the layer of fiber material is selected from the group consisting of non-woven fabrics, woven fabrics, and non-woven scrims.

The term "non-woven fabric" designates in the present document materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a non-woven fabric.

The term "non-woven scrim" designates in the present document web-like non-woven products composed of yarns, which lay on top of each other and are chemically bonded to each other. Typical materials for non-woven scrims include metals, fiberglass, and plastics, in particular polyester, polypropylene, polyethylene, and polyethylene terephthalate (PET).

According to one or more embodiments, the layer of fiber material is a non-woven fabric, preferably a non-woven fabric having a mass per unit weight of not more than 200 $g/m^2$, more preferably not more than 150 $g/m^2$. Such non-woven fabrics enable the adhesive sealant layer to partially penetrate the layer of fiber material and to form an adhesive bond with the barrier layer. According one or more embodiments, the layer of fiber material is a non-woven fabric having a mass per unit weight of 15-150 $g/m^2$, preferably 25-100 $g/m^2$, more preferably 35-75 $g/m^2$, most preferably 45-65 $g/m^2$.

Preferably, the non-woven fabric comprises synthetic organic and/or inorganic fibers. Suitable synthetic organic fibers for the non-woven fabric include, for example, polyester fibers, polypropylene fibers, polyethylene fibers, nylon fibers, and polyamide fibers. Suitable inorganic fibers for the non-woven fabric include, for example, glass fibers, aramid fibers, wollastonite fibers, and carbon fibers.

According to one or more embodiments, the non-woven fabric is composed of synthetic organic fibers, preferably selected from the group consisting of polyester fibers, polypropylene fibers, polyethylene fibers, nylon fibers, and polyamide fibers. According to one or more further embodiments, the non-woven fabric is composed of inorganic fibers, preferably selected from the group consisting of glass fibers, aramid fibers, wollastonite fibers, and carbon fibers, more preferably glass fibers.

It may be preferable that the layer of fiber material covers at least 50%, more preferably at least 65%, most preferably at least 75% of the area of the second major surface of the barrier layer. According to one or more embodiments, the layer of fiber material covers substantially the entire area of the second major surface of the barrier layer. Furthermore, it may be preferable, for example due to production technical reasons, that narrow segments near the longitudinal edges of the barrier layer and having a width of 1-2 mm are not covered with the layer of fiber material.

The layer of fiber material can be directly or indirectly bonded to the second major surface of the barrier layer. The opposing surfaces of the barrier layer and the layer of fiber material can be directly bonded to each other, for example, through thermal bonding or indirectly, for example, via a layer of adhesive.

According to one or more embodiments, the layer of fiber material is directly bonded over at least part of its surface to the second major surface of the barrier layer through thermal bonding. It may furthermore be preferable that the layer of fiber material is partially embedded into the barrier layer. The expression "partially embedded" is understood to mean that portion of the fibers contained in the layer of fiber material are embedded into the barrier layer, i.e. covered by the matrix of the barrier layer whereas other portion of the fibers are not embedded into the barrier layer.

According to one or more further embodiments, the layer of fiber material is indirectly bonded over at least part of its surface to the second major surface of the barrier layer via a layer of adhesive. The type of adhesive used for bonding of the layer of fiber material to the barrier layer is not particularly restricted. Suitable adhesives include, for example, reactive 1- and 2-component reactive adhesives, hot-melt adhesives, and solvent- and water-based adhesives.

The waterproofing membrane may further comprise a reinforcement layer, which is fully embedded into the barrier layer. It may, however, be also possible or even preferred that the waterproofing membrane does not contain any reinforcement layers, which are fully embedded into the barrier layer. By the expression "fully embedded" is meant that the reinforcement layer is fully covered by the matrix of the barrier layer.

The type of the reinforcement layer, if used, is not particularly restricted. For example, the reinforcement layers commonly used for improving the dimensional stability of thermoplastic roofing membranes can be used. Preferable reinforcement layers include non-woven fabrics, woven fabrics, and non-woven scrims, and combinations thereof.

The waterproofing membrane may be a single- or a multi-ply membrane. The term "single-ply membrane" designates in the present document membranes comprising one single barrier layer and the term "multi-ply roofing membrane refers to membranes comprising more than one barrier layers having similar or different compositions. Single- and multi-ply membranes are known to a person skilled in the art and they may be produced by any conventional means, such as by way of extrusion or co-extrusion, calendaring, or by spread coating. According to one or more embodiments, the waterproofing membrane is a single-ply membrane comprising exactly one barrier layer.

According to one or more further embodiments, the waterproofing membrane is a multi-ply membrane comprising at least two barrier layers. In these embodiments, the waterproofing membrane further comprises a second barrier layer having first and second major surfaces, wherein the second major surface of the second barrier layer is directly or indirectly adhered to at least portion of the first major surface of the barrier layer.

According to one or more embodiments, the second barrier layer is composed of a third composition comprising at least one thermoplastic polymer, preferably selected from the group consisting of ethylene-vinyl acetate copolymer (EVA), ethylene-acrylic ester copolymers, ethylene-α-olefin co-polymers, ethylene-propylene copolymers, propylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB).

The second barrier layer may further comprise a reinforcement layer, which is fully embedded into the second barrier layer. It may, however, be also possible or even preferred that the second barrier layer does not contain any reinforcement layers, which are fully embedded into the second barrier layer.

According to one or more embodiments, the sealing device further comprises a release liner covering at least portion of the outer major surface of the adhesive sealant layer facing away from the second primary exterior surface of the waterproofing membrane. Preferably, the adhesive sealant layer and the release liner are directly connected to each other over at least portion of their opposing major surfaces. The release liner may be used to prevent premature unwanted adhesion and to protect the adhesive sealant layer from moisture, fouling, and other environmental factors. In case the sealing device is provided in form of rolls, the release liner enables ease of unwind without sticking of the adhesive sealant to the back side of the sealing device. The release liner may be sliced into multiple sections to allow portioned detachment of the liner from the adhesive sealant layer.

Suitable materials for the release liner include Kraft paper, polyethylene coated paper, silicone coated paper as well as polymeric films, for example, polyethylene, polypropylene, and polyester films coated with polymeric release agents selected from silicone, silicone urea, urethanes, waxes, and long chain alkyl acrylate release agents.

The adhesive sealant layer used in the present invention is composed of a first composition comprising:
  a) At least one elastomer,
  b) At least one at 25° C. liquid polyolefin resin, and
  c) At least one inert mineral filler.

The type of the at least one elastomer contained in the adhesive sealant composition is not particularly restricted. Preferably, the at least one elastomer is selected from the group consisting of ethylene-propylene rubber (EPR), butyl rubber, halogenated butyl rubber, ethylene-propylene diene rubber (EPDM), natural rubber, chloroprene rubber, synthetic 1,4-cis-polyisoprene, polybutadiene, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer. Term "ethylene-propylene rubber (EPR)" designates in the present disclosure elastomeric copolymers of ethylene and propylene whereas the term "ethylene-propylene diene (EPDM) rubber refers to elastomeric terpolymers comprising 15-70 wt.-%, preferably 20-45 wt.-% of propylene, 20-80 wt.-% of ethylene, and 2-15 wt.-% of a diene, for example, 1,4-hexadiene, norbornadiene, ethylidene-norbornene, dicyclopentadiene, butadiene, or isoprene.

According to one or more embodiments, the at least one elastomer is selected from the group consisting of ethylene-propylene rubber (EPR), butyl rubber, synthetic 1,4-cis-polyisoprene, polybutadiene, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer, preferably from the group consisting of ethylene-propylene rubber (EPR), butyl rubber, synthetic 1,4-cis-polyisoprene, polybutadiene, styrene-butadiene copolymer, isoprene-butadiene copolymer, and styrene-isoprene-butadiene rubber, more preferably from the group consisting of ethylene-propylene rubber (EPR), butyl rubber, synthetic 1,4-cis-polyisoprene, and polybutadiene.

It is furthermore preferred that the at least one elastomer is not chemically crosslinked. The term "chemically crosslinked" is understood to mean that the polymer chains forming the elastomer are inter-connected by a plurality of covalent bonds, which are mechanically and thermally stable.

According to one or more embodiments, the at least one elastomer is present in the first composition in an amount of 1-30 wt.-%, preferably 5-25 wt.-%, more preferably 10-25 wt.-%, even more preferably 15-25 wt.-%, still more preferably 17.5-25 wt.-%, based on the total weight of the first composition.

Adhesive sealant layers containing the at least one elastomer in an amount within the above cited ranges have been found out to enable providing the sealing device with a self-healing effect. The term "self-healing effect" refers to the ability of the sealing device to regain its water-tightness after being exposed to a mechanical damages resulting in loss of integrity of the sealing device. Depending on the field of application of the sealing device, such damages can occur, for example, during construction or inspection phases of a roof system or as a result of hailstone impacts. Even a small breach on the waterproofing membrane can enable ingress of significant amounts of water through the sealing device with a subsequent damage to the substrate, such as a building structure, covered by the sealing device. It has been found out that the sealing device of the present invention can regain its water tightness after being mechanically damaged due to the specific composition of the adhesive sealant layer. Furthermore, breaches and holes in the waterproofing membrane have been found to be sealed within a time period of less than 50 hours after the membrane has been damaged in case the amount of the at least one elastomer in the adhesive sealant layer is within the above cited ranges.

Preferably, the at least one at 25° C. liquid polyolefin resins is selected from the group consisting of at 25° C. liquid polybutene and polyisobutylene. The term "at 25° C. liquid polybutene" refers in the present document to low molecular weight olefin oligomers comprising isobutylene and/or 1-butene and/or 2-butene. The ratio of the $C_4$-olefin isomers can vary by manufacturer and by grade. When the C4-olefin is exclusively 1-butene, the material is referred to as "poly-n-butene" or "PNB". The term "at 25° C. liquid polyisobutylene" refers in the present document to low molecular weight polyolefins and olefin oligomers of isobutylene, preferably containing at least 75%, more preferably at least 85% of repeat units derived from isobutylene. Particularly suitable at 25° C. liquid polybutenes and polyisobutylenes have an average molecular weight ($M_n$) of not more than 15'000 g/mol, preferably not more than 5'000 g/mol, even more preferably not more than 3'000 g/mol, still more preferably not more than 2'500 g/mol, such as not more than 1'000 g/mol.

Suitable commercially available at 25° C. liquid polybutenes and polyisobutylenes include, for example, Indopol® H-300, Indopol® H-1200, and Indopol® H-1500 (from Ineos); Glissopal® V230, Glissopal® V500, Glissopal® V700, and Glissopal ® V1500 (from BASF); Dynapak® poly 230 (from Univar GmbH, Germany); and Daelim® PB 950 (from Daelim Industrial).

According to one or more embodiments, the at least one at 25° C. liquid polyolefin resin is at 25° C. liquid polyisobutylene, preferably having an average molecular weight ($M_n$) of not more than 5'000 g/mol, more preferably not more than 3'000 g/mol, even more preferably not more than 2'500 g/mol and/or a polydispersity index ($M_w/M_n$), determined by GPC, of not more than 5, preferably in the range of 0.5-5.0, more preferably 1.0-4.5, even more preferably 1.0-3.5, still more preferably 1.25-2.5.

According to one or more embodiments, the at least one at 25° C. liquid polyolefin resin is present in the first composition in an amount of 10-60 wt.-%, preferably 15-50 wt.-%, more preferably 25-50 wt.-%, even more preferably 30-45 wt.-%, based on the total weight of the first composition.

The term "inert mineral filler" designates in the present document mineral fillers, which, unlike mineral binders, do not undergo a hydration reaction in the presence of water.

Preferably the at least one inert mineral filler is selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The term "sand" refers in the present document to mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%. The term "calcium carbonate" as inert mineral filler refers in the present document to calcitic fillers produced from chalk, limestone or marble by grinding and/or precipitation.

According to one or more embodiments, the at least one inert mineral filler is present in the first composition in an amount of 5-60 wt.-%, preferably 25-55 wt.-%, more preferably, 35-45 wt.-%, based on the total weight of the first composition.

According to one or more embodiment, the first composition comprises less than 20 wt.-%, more preferably less than 15 wt.-%, even more preferably less than 10 wt.-%, most preferably less than 5 wt.-%, based on the total weight of the first composition, of water-swellable mineral fillers. The term "water-swellable mineral filler" refers in the present disclosure to mineral fillers that are capable of swelling upon contact with water, i.e. mineral fillers that swell in the presence of water. Examples of water-swellable mineral fillers include, in particular, water-swellable clays, such as montmorillonite clays, for example calcium montmorillonite, sodium montmorillonite, calcium bentonite, and sodium bentonite.

Clays in general are layered hydrous aluminum phyllosilicates containing a crystal structure consisting of Al—OH or Fe—OH or Mg—OH octahedral layer, sandwiched between two Si—O tetrahedral sheets, and exchangeable interlayer cations. The nature of the exchangeable interlayer cations determines the characteristics of the clay. In case of a water-swellable clay, the exchangeable cations are hydratable upon contacting the clay with water. When the exchangeable cations are hydrated and water molecules are able to enter the space between the structure layers, the distance and volume between the two layers increases leading to swelling of the clay.

According to one or more embodiments, the first composition comprises less than 20 wt.-%, preferably less than 15 wt.-%, more preferably less than 10 wt.-%, even more preferably less than 5 wt.-%, still more preferably less than 2.5 wt.-%, based on the total weight of the first composition, of montmorillonite clays selected from the group consisting of calcium bentonite, and sodium bentonite. According to one or more further embodiments, the first composition comprises less than 20 wt.-%, preferably less than 15 wt.-%, more preferably less than 10 wt.-%, even more preferably less than 5 wt.-%, still more preferably less than 2.5 wt.-%, based on the total weight of the first composition, of montmorillonite clays selected from the group consisting of calcium montmorillonite, sodium montmorillonite, calcium bentonite, and sodium bentonite.

According to one or more further embodiments, the first composition is essentially free of water-swellable clays. The term "essentially free" is understood to mean that the amount of water-swellable clays is not more than 2.5 wt.-%, preferably not more than 1.5 wt.-%, more preferably not more than 1.0 wt.-%, even more preferably not more than 0.5 wt.-%, based on the total weight of the first composition. According to one or more embodiments, the first composition is essentially free of montmorillonite clays selected from the group consisting of calcium bentonite, and sodium bentonite, preferably selected from the group consisting of calcium montmorillonite, sodium montmorillonite, calcium bentonite, and sodium bentonite.

The first composition may further comprise at least one hydrocarbon resin. Suitable hydrocarbon resins to be used in the adhesive sealant layer include synthetic resins, natural resins, and chemically modified natural resins. Preferably, the at least one hydrocarbon resin has a softening point measured by Ring and Ball method according to DIN EN 1238 in the range of 65-200° C., more preferably 75-160° C., even more preferably 75-150° C., most preferably 85-140° C. and/or a glass transition temperature ($T_g$) determined by differential scanning calorimetry method (DSC) according to ISO 11357 standard using a heating rate of 2° C./min of at or above 0° C., more preferably at or above 15° C., even more preferably at or above 30° C., still more preferably at or above 45° C.

It may be preferable that the at least one hydrocarbon resin is present in the first composition in an amount of not more than 20 wt.-%, more preferably not more than 15 wt.-%, based on the total weight of the first composition. According to one or more embodiments, the at least one hydrocarbon resin is present in the first composition in an amount of 0.5-20 wt.-%, preferably 1-15 wt.-%, more preferably 1-10 wt.-%, even more preferably 1-7.5 wt.-%, based on the total weight of the first composition.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins obtainable from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers in the present document to compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, and mixtures thereof. Aliphatic monomers can include $C_4$, $C_5$, and $C_6$ paraffins, olefins, and conjugated diolefins. Examples of aliphatic monomers or cycloaliphatic monomers include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomers can include $C_8$, $C_9$, and $C_{10}$ aromatic monomer, such as styrene, indene, derivatives of styrene, derivatives of indene, coumarone and combinations thereof.

In particular, suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum based feedstocks are referred in the present document as "petroleum hydrocarbon resins". These include also pure monomer aromatic resins, which are made by polymerizing aromatic monomer feedstocks that have been purified to eliminate color causing contaminants and to precisely control the composition of the product. Petroleum hydrocarbon resins typically have a relatively low average molecular weight ($M_n$), such in the range of 250-5'000 g/mol and a glass transition temperature ($T_g$) of above 0° C., preferably equal to or higher than 15° C., more preferably equal to or higher than 30° C.

It may be preferable that the at least one hydrocarbon resin is a petroleum hydrocarbon resin, preferably selected from the group consisting of C5 aliphatic petroleum hydrocarbon resins, mixed C5/C9 aliphatic/aromatic petroleum hydrocarbon resins, aromatic modified C5 aliphatic petroleum hydrocarbon resins, cycloaliphatic petroleum hydrocarbon resins, mixed C5 aliphatic/cycloaliphatic petroleum hydrocarbon resins, mixed C9 aromatic/cycloaliphatic petroleum hydrocarbon resins, mixed C5 aliphatic/cycloaliphatic/C9 aromatic petroleum hydrocarbon resins, aromatic modified cycloaliphatic petroleum hydrocarbon resins, and C9 aromatic petroleum hydrocarbon resins as well hydrogenated versions of the aforementioned resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%. According to one or more embodiments, the at least one hydrocarbon resin is an aliphatic C5/C9 petroleum hydrocarbon resin.

According to one or more embodiments, the first composition comprises:
a) 1-30 wt.-%, preferably 5-25 wt.-%, more preferably 10-25 wt.-%, even more preferably 15-25 wt.-%, still more preferably 17.5-25 wt.-% of the at least one elastomer, preferably selected from the group consisting of ethylene-propylene rubber (EPR), butyl rubber, synthetic 1,4-cis-polyisoprene, polybutadiene, styrene-butadiene copolymer, isoprene-butadiene copolymer, and styrene-isoprene-butadiene rubber, more preferably selected from the group consisting of ethylene-propylene rubber (EPR), butyl rubber, synthetic 1,4-cis-polyisoprene, and polybutadiene, b) 10-50 wt.-%, preferably 15-50 wt.-%, more preferably 25-50 wt.-%, even more preferably 30-45 wt.-% of the at least one at 25° C. liquid polyolefin resin, preferably at 25° C. liquid polyisobutylene, preferably having an average molecular weight ($M_n$) of not more than 5'000 g/mol, more preferably not more than 3'000 g/mol, even more preferably not more than 2'500 g/mol and/or a polydispersity index (Mw/Mn), determined by GPC, of not more than 5, preferably in the range of 0.5-5.0, more preferably 1.0-4.5, even more preferably 1.0-3.5, still more preferably 1.25-2.5, and c) 5-60 wt.-%, preferably 25-55 wt.-%, more preferably, 35-45 wt.-% of the at least one inert mineral filler, preferably selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites, more preferably selected from the group consisting of calcium carbonate, mica, talc, magnesium carbonate, and silica, all proportions being based on the total weight of the first composition.

According to one or more embodiments, the first composition further comprises at least one electrically conductive filler selected from the group consisting of carbon fibers, steel fibers, carbon black particles, carbon nanotubes, and graphite particles.

The particles of the at least one electrically conductive filler are preferably distributed throughout the entire volume of the adhesive sealant layer. The term "distributed throughout the entire volume" in understood to mean that the particles of the at least one electrically conductive filler, for example carbon fibers, are present in essentially all portions of the adhesive sealant layer but it does not necessarily imply that their distribution is uniform throughout the adhesive sealant layer. It may, however, be preferable that the particles of the at least one electrically conductive filler are uniformly distributed throughout the entire volume of the adhesive sealant layer. For a person skilled in the art it is clear that even if the particles of the at least one electrically conductive filler are uniformly distributed, there may be regions in the adhesive sealant layer, which have a slightly higher concentration of the particles of the at least one electrically conductive filler than other regions and that a 100% uniform distribution is generally not achievable.

Preferably, the at least one electrically conductive filler is present in the first composition in an amount of 0.5-15 wt.-%, preferably 1-10 wt.-%, based on the total weight of the first composition. It has been found that the electrically conductive filler can be added to the composition of the adhesive sealant layer in the above cited amounts without having significant negative effect on adhering properties of the sealing device, such as adhesive bond strength and thermal stability. On the other hand, the above cited amounts of electrically conductive filler have been found to be sufficient to decrease the resistance of the adhesive sealant layer to a level, which enables detection of leakages based on low voltage methods.

In a low voltage detection method for detecting leakages, the exterior surface of a sealing device facing away from the waterproofed substrate is first wetted with a thin layer of water. Then a low voltage potential difference is created between a conductor placed on the exterior surface of the sealing device and another conductor embedded in the adhesive sealant layer. In case of an intact waterproofing membrane, no current can flow between the conductors due to the high resistance of the barrier layer(s). Therefore, a detected current is a clear indication of a breach in the barrier layer(s) through which the water has penetrated and reached the adhesive sealant layer. A high voltage leak detection method differs from low voltage detection method in that the measurement is performed on a dry exterior surface of the sealing device.

The first composition may further comprise one or more auxiliary additives selected from UV absorbers, UV stabilizers, heat stabilizers, antioxidants, flame retardants, optical brighteners, pigments, dyes, and biocides. The auxiliary additives, if used at all, preferably comprise not more than 20 wt.-%, more preferably not more than 10 wt.-%, most preferably not more than 5 wt.-%, of the total weight of the first composition.

The thickness of the adhesive sealant layer is not particularly restricted. According to one or more embodiments, the adhesive sealant layer has a thickness measured by using the measurement method as defined in DIN EN 1849-2 standard of 0.1-5.0 mm, preferably 0.5-3.0 mm, more preferably 0.5-2.5 mm, even more preferably 0.75-2.0 mm, still more preferably 1.0-2.0 mm.

Preferably the sealing device has a peel strength from metal measured by using the method as defined in EN DIN 1372 standard of at least 20 N/50 mm, more preferably at least 30 N/50 mm, most preferably at least 35 N/50 mm.

The sealing device of the present invention is typically provided in a form of a prefabricated membrane article, which is delivered to the construction site and unwound from rolls to provide sheets having a width of 1-5 m and length of several times the width. However, the sealing device can also be used in the form of strips having a width of typically 1-20 cm, for example so as to seal joints between two adjacent membranes. Moreover, the sealing device can also be provided in the form of planar bodies, which are used for repairing damaged locations in existing adhered waterproofing or roofing systems.

The preferences given above for the waterproofing membrane, the barrier layer(s), the layer of fiber material, the adhesive sealant layer, and to the release liner apply equally to all aspects of the present invention unless otherwise stated.

Another subject of the present invention is a method for producing a sealing device according to the present invention, the method comprising steps of:

i) Providing a waterproofing membrane having a first and a second primary exterior surface, ii) Heating a first composition of the adhesive sealant layer to allow the composition to flow, and iii) Coating the heated composition onto the second primary exterior surface of the waterproofing membrane.

The heated composition of the adhesive sealant layer may be applied on the second primary exterior surface of the waterproofing membrane using any conventional means such as by die coating, extrusion coating, roller coating, powder dispersion, or by spray lamination techniques. The temperature to which the composition is heated in step ii) depends on the embodiment of the sealing device. It may be preferable that the composition is heated to a temperature in the range of 50-150° C., such as 75-125° C., in particular 80-120° C.

The further details of the method for producing the sealing device depend on the embodiment of the sealing device.

According to one or more embodiments, the waterproofing membrane comprises a barrier layer having a first and a second major surface and a layer of fiber material, wherein the step i) comprises:
- i') Extruding and/or calendering a composition of the barrier layer through a die on a surface of the layer of fiber material to form a fiber layer-backed barrier layer,
- ii') Optionally employing spaced apart calender cooling rolls through which the fiber layer-backed barrier layer obtained in step i') is drawn.

In the extrusion step, the composition of the barrier layer is first melt-processed in an extruder to produce a homogenized melt, which is then extruded through the extruder die. Suitable extrusion apparatuses comprising at least one extruder and an extruder die are well known to a person skilled in the art. Any conventional extruders, for example, a ram extruder, single screw extruder, or a twin-screw extruder may be used. Preferably, the extruder is a screw extruder, more preferably a twin-screw extruder.

Another subject of the present invention is a method for waterproofing a substrate, the method comprising steps of:
- I) Providing one or more sealing devices according to the present invention,
- II) Applying the sealing device(s) on the surface of the substrate to be waterproofed such that at least portion of the outer major surface of the adhesive sealant layer is directly contacted with surface of the substrate,
- III) Pressing the sealing device(s) against the surface of the substrate with a pressure sufficient to affect adhesive bonding between the sealing device(s) and the substrate.

The term "outer surface of the adhesive sealant layer refers here to the surface of the adhesive sealant layer, which faces away from the second primary exterior surface of the waterproofing membrane According to one or more embodiments, the method for waterproofing a substrate comprises steps of:
- I') Providing at least two sealing devices according to the present invention,
- II') Applying the sealing devices on the surface of the substrate to be waterproofed such that at least portion of the outer major surface of the adhesive sealant layer of each sealing device is directly contacted with surface of the substrate and such that the edges of adjacent sealing devices are overlapped to form lapped joints,
- III') Pressing the sealing devices against the surface of the substrate with a pressure sufficient to affect adhesive bonding between the sealing devices and the surface of the substrate and between the edges of adjacent sealing devices in the overlapping areas.

Another subject of the present invention is a fully-adhered roof system comprising a roof substrate and a sealing device according to the present invention directly adhered to a surface of the roof substrate via the adhesive sealant layer. The expression "directly adhered" is understood to mean that there are no further layers present between the adhesive sealant layer and the roof substrate.

The roof substrate to which the sealing device is bonded is preferably selected from the group consisting of an insulation board, a cover board, and an existing roofing membrane.

According to one or more embodiments at least 50%, preferably at least 75%, most preferably at least 85% of the area of the second primary exterior surface of the waterproofing membrane is adhered to the surface of the roof substrate via the adhesive sealant layer. According to one or more embodiments, substantially the entire area of the second primary exterior surface of the barrier layer is adhered to the surface of the roof substrate via the adhesive sealant layer.

Still another subject of the present invention is the use of an adhesive sealant composition for providing a self-healing roofing membrane comprising a waterproofing membrane having a first and a second primary exterior surface and a layer of the adhesive sealant composition covering at least a portion of the second primary exterior surface of the waterproofing membrane, wherein the adhesive sealant composition comprises:
- a) At least one elastomer,
- b) At least one at 25° C. liquid polyolefin resin, and
- c) At least one inert mineral filler.

According to one or more embodiments, the layer of the adhesive sealant composition covers at least 50%, more preferably at least 65%, most preferably at least 75% of the area of the second primary exterior surface of the waterproofing membrane.

According to one or more embodiments, the adhesive sealant composition is the first composition of the sealing device of the present invention as described above.

DETAILED DESCRIPTION OF THE DRAWINGS

Figure 1:
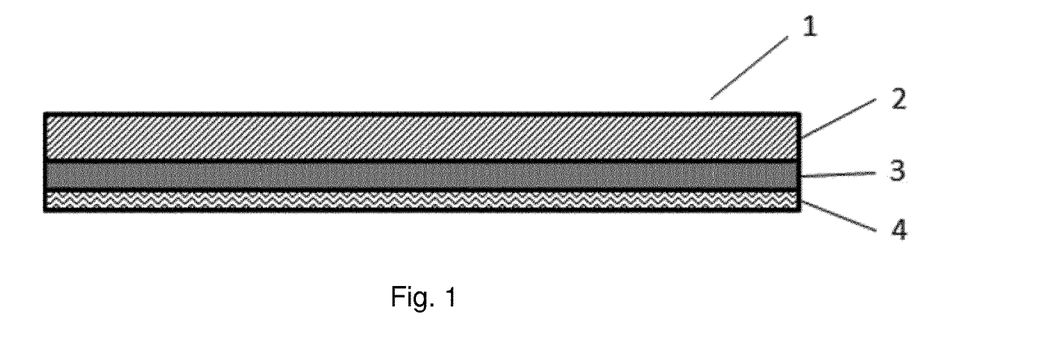
FIG. 1 shows a cross-section of a sealing device (1) comprising a waterproofing membrane (2), an adhesive sealant layer (3), and a release liner (4) covering the outer major surface of adhesive sealant layer (3).

FIG. 1 shows a cross-section of a sealing device (1) comprising a waterproofing membrane (2), an adhesive sealant layer (3), and a release liner (4) covering the outer major surface of adhesive sealant layer (3). In this embodiment, the adhesive sealant layer (3) covers substantially the entire area of the second primary exterior surface of the waterproofing membrane (2) and the release liner (4) covers substantially the entire outer major surface of the adhesive sealant layer (3) facing away from the second primary exterior surface of the waterproofing membrane (2).

Figure 2:
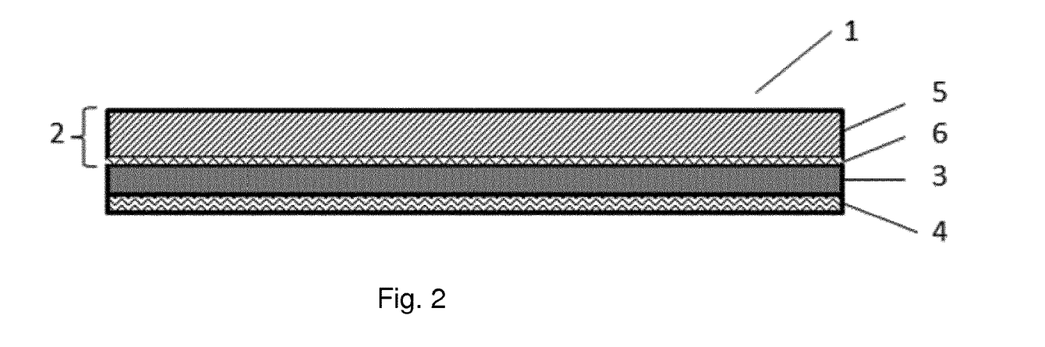
FIG. 2 shows a cross-section of a sealing device (1) comprising a waterproofing membrane (2), an adhesive sealant layer (3), and a release liner (4) covering the outer major surface of adhesive sealant layer (3), wherein the waterproofing membrane (2) is composed of a barrier layer (5) and a layer of fiber material (6).

FIG. 2 shows a cross-section of a sealing device (1) according to one embodiment of the sealing device presented in FIG. 1. In this embodiment, waterproofing membrane (2) comprises a barrier layer (5) and a layer of fiber material (6) covering substantially the entire area of the second major surface of the barrier layer (5), which in this embodiment forms the second primary exterior surface of the waterproofing membrane.

Figure 3:
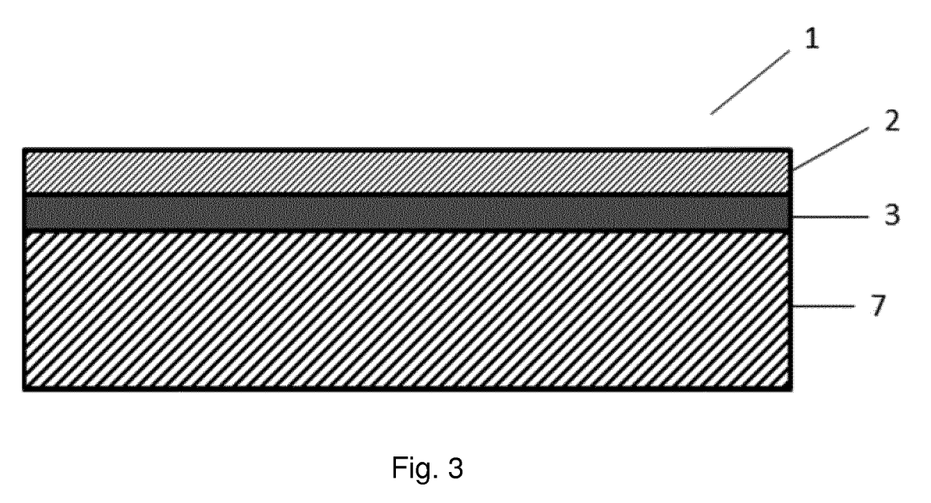
FIG. 3 shows a cross-section of a fully-adhered roof system comprising a roof substrate (7) and a sealing device (1) composed of a waterproofing membrane (2) and an adhesive sealant layer (3), wherein the sealing device is directly bonded to a surface of the roof substrate (7) via the adhesive sealant layer (3).

FIG. 3 shows a cross-section of a fully-adhered roof system comprising a roof substrate (7) and a sealing device (1), which is directly adhered to a surface of the roof substrate (7) via the adhesive sealant layer (3). In this embodiment, substantially the entire area of the second primary exterior surface of the waterproofing membrane (2) is adhered to the surface of the roof substrate (7) via the adhesive sealant layer (3). Furthermore, the waterproofing membrane (2) is composed of a barrier layer having a first and a second major surface, which forms the second primary exterior surface of the waterproofing membrane (2).

EXAMPLES

The raw materials presented in Table 1 were used in preparing the exemplary compositions used for the adhesive sealant layers.

TABLE 1

| | |
|---|---|
| Elastomer | Ethylene propylene copolymer rubber (EPR); Mooney viscosity (ML 1 + 4, 125° C.) of 15-35 MU determined according to ASTM D1646 |

TABLE 1-continued

| | |
|---|---|
| Liquid polyolefin resin | At 25° C. liquid polyisobutylene, average molecular weight ($M_n$) 1500-2500 g/mol |
| Mineral filler | Talc, $d_{50}$ particle size < 20 μm |
| Hydrocarbon resin | Hydrocarbon resin, softening point 85-120° C. |
| Additive package | Contains pigments, antioxidants, and preservatives |

Preparation of the Sealing Devices

Sealing devices were prepared by coating the exemplary adhesive sealant compositions onto the back surface of a flexible TPO-based waterproofing membrane with a coating thickness of ca. 1.5 mm. The ingredients of the tested adhesive sealant compositions are shown in Table 2. The adhesive sealant compositions were prepared by mixing the ingredients with each other using a conventional batch-type mixer and applied onto the back surface of a flexible TPO-based waterproofing membrane at an elevated temperature.

The flexible TPO-based waterproofing membrane used for providing the exemplary sealing devices was produced according to the procedure as disclosed in the "Examples" section of a published patent application WO 2019/025584 A1. The flexible TPO-based waterproofing membrane was composed of a single barrier layer had a thickness of ca. 0.8 mm and the composition and production procedure of the barrier layer corresponded to those of the exemplary sheet of Ex-2 as presented in Table 2 on page 33 of WO 2019/025584 A1.

Self-Healing Properties of the Sealing Devices

The self-healing properties of the prepared sealing devices were determined by measuring the period of time required for the sealing device to regain its water tightness at a temperature of 40° C. after a hole had been punched through the sealing device.

For the measurement of the self-healing properties, the sealing devices were laid on a polyisocyanurate (PIR) board having a thickness of ca. 10 cm with the layer of adhesive sealant facing the surface of the PIR board. A hole having a diameter of ca. 5 mm was then punched through both layers of the tested sealing device using a Phillips screwdriver. The sealing device was then stored at a temperature of 40° C. for the measurement of the self-healing time. The water tightness of the sealing device was determined according to EN 12691 standard and the length of the time period required for the sealing device to regain its water tightness was recorded as "the self-healing time" shown in Table 2 below.

TABLE 2

| | Ex 1 | Ex 2 | Ex 3 | Ex-4 |
|---|---|---|---|---|
| Compositions, [wt.-%] | | | | |
| Elastomer | 12.60 | 15.27 | 17.78 | 22.38 |
| Liquid polyolefin resin | 38.06 | 36.90 | 35.80 | 33.80 |
| Mineral filler | 45.01 | 43.64 | 42.34 | 39.97 |
| Hydrocarbon resin | 3.60 | 3.49 | 3.39 | 3.20 |
| Additive package | 0.73 | 0.71 | 0.69 | 0.65 |
| Total | 100.00 | 100.00 | 100.00 | 100.00 |
| Properties | | | | |
| Self-healing time [hours] | 48 | 48 | 24 | 36 |

The invention claimed is:

1. A sealing device comprising:
   i. a waterproofing membrane having a first and a second primary exterior surface,
   ii. an adhesive sealant layer covering at least portion of the second primary exterior surface of the waterproofing membrane, wherein the adhesive sealant layer is composed of a first composition comprising:
      a) at least one elastomer,
      b) at least one polyolefin resin that is liquid at 25° C., and
      c) at least one inert mineral filler, and
   wherein the adhesive sealant layer comprises less than 5 weight % of water swellable mineral fillers.

2. The sealing device according to claim 1, wherein the at least one polyolefin resin is polyisobutylene, having an average molecular weight ($M_n$) of not more than 5,000 g/mol.

3. The sealing device according to claim 1, wherein the adhesive sealant layer covers substantially the entire area of the second primary exterior surface of the waterproofing membrane.

4. The sealing device according to claim 1, wherein the waterproofing membrane comprises a barrier layer having a first and a second major surface.

5. The sealing device according to claim 4, wherein the barrier layer is composed of a second composition comprising at least one thermoplastic polymer selected from the group consisting of ethylene-vinyl acetate copolymer, ethylene-acrylic ester copolymers, ethylene-α-olefin copolymers, ethylene-propylene copolymers, propylene copolymers, polypropylene, polyethylene, polyvinylchloride, polyethylene terephthalate, polystyrene, polyamides, chlorosulfonated polyethylene, ethylene propylene diene rubber, and polyisobutylene.

6. The sealing device according to claim 5, wherein the at least one thermoplastic polymer comprises at least one thermoplastic polyolefin.

7. The sealing device according to claim 1, wherein the waterproofing membrane further comprises a layer of fiber material covering at least portion of the second major surface of the barrier layer and positioned between the barrier layer and the adhesive sealant layer.

8. The sealing device according to claim 7, wherein the layer of fiber material is a non-woven fabric having a mass per unit area of 15-150 g/m².

9. The sealing device according to claim 8, wherein the non-woven fabric comprises at least one of synthetic organic and inorganic fibers.

10. The sealing device according to claim 1, wherein the first composition further comprises at least one hydrocarbon resin, having at least one of a softening point measured by Ring and Ball method according to DIN EN 1238 in the range of 65-200° C., and a glass transition temperature determined by differential scanning calorimetry method according to ISO 11357 standard using a heating rate of 2° C/min of at or above 0° C.

11. The sealing device according to claim 1, wherein the first composition comprises:
   a) 1-30 wt.-% of the at least one elastomer selected from the group consisting of ethylene-propylene rubber, butyl rubber, synthetic 1,4-cis-polyisoprene, polybutadiene, styrene-butadiene copolymer, isoprene-butadiene copolymer, and styrene-isoprene-butadiene rubber,
   b) 10-50 wt.-% of the at least one polyolefin resin, and
   c) 5-60 wt.-% of the at least one inert mineral filler selected form the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites, all proportions being based on the total weight of the first composition.

12. The sealing device according to claim 1, wherein the first composition further comprises at least one electrically conductive filler selected from the group consisting of carbon fibers, steel fibers, carbon black, carbon nanotubes, and graphite.

13. The sealing device according to claim 12, wherein
   (1) particles of the at least one electrically conductive filler are distributed throughout the entire volume of the adhesive sealant layer, or
   (2) the at least one electrically conductive filler is present in the first composition in an amount of 0.5-15.0 wt.-%, based on the total weight of the first composition, or
   (3) particles of the at least one electrically conductive filler are distributed throughout the entire volume of the adhesive sealant layer, and the at least one electrically conductive filler is present in the first composition in an amount of 0.5-15.0 wt.-%, based on the total weight of the first composition.

14. The sealing device according to claim 1, wherein the adhesive sealant layer has a thickness determined by using the measurement method as defined in DIN EN 1849-2 standard of 0.1-5.0 mm.

15. A method for producing a sealing device according to claim 1, the method comprising steps of:
   i) providing a waterproofing membrane having a first and a second primary exterior surface as defined in claim 1,
   ii) heating a first composition as defined in claim 1 to allow the composition to flow, and
   iii) coating the heated composition onto the second primary exterior surface of the waterproofing membrane.

16. A method for waterproofing a substrate, the method comprising steps of:
   i) providing one or more sealing devices according to claim 1,
   ii) applying the sealing device(s) on a surface of the substrate to be waterproofed such that at least portion of the outer major surface of the adhesive sealant layer is directly contacted with surface of the substrate,
   iii) pressing the sealing device(s) against the surface of the substrate with a pressure sufficient to affect adhesive bonding between the sealing device(s) and the substrate.

17. A fully-adhered roof system comprising a roof substrate and a sealing device according to claim 1 directly adhered to a surface of the roof substrate via the adhesive sealant layer.

18. The fully-adhered roof system according to claim 17, wherein the roof substrate is selected from the group consisting of an insulation board, a cover board, and an existing roofing membrane.

19. A method for providing a self-healing roofing membrane comprising a waterproofing membrane having a first and a second primary exterior surface, the method comprising covering at least a portion of the second primary exterior surface of the waterproofing membrane with a layer of an adhesive sealant composition, wherein the adhesive sealant composition comprises:
   a) at least one elastomer,
   b) at least one polyolefin resin that is liquid at 25° C., and
   c) at least one inert mineral filler, and
   wherein the adhesive sealant layer comprises less than 5 weight % of water swellable mineral fillers.

20. The sealing device according to claim 1, which includes:
   iii. a release liner.

* * * * *